(12) United States Patent
Maor et al.

(10) Patent No.: US 10,057,280 B2
(45) Date of Patent: *Aug. 21, 2018

(54) METHODS AND SYSTEMS OF DETECTING AND ANALYZING CORRELATED OPERATIONS IN A COMMON STORAGE

(71) Applicant: Synopsys, Inc., Mountain View, CA (US)

(72) Inventors: Ofer Maor, Tel-Aviv (IL); Tamir Eran, Motza Elite (IL); Shavro Tamir, Herzlia (IL)

(73) Assignee: SYNOPSYS, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/063,452

(22) Filed: Mar. 7, 2016

(65) Prior Publication Data
US 2016/0191557 A1    Jun. 30, 2016

Related U.S. Application Data

(63) Continuation of application No. 13/515,545, filed as application No. PCT/IL2010/001060 on Dec. 14, 2010, now Pat. No. 9,280,668.
(Continued)

(51) Int. Cl.
*H04L 29/06* (2006.01)
*G06F 21/56* (2013.01)
(Continued)

(52) U.S. Cl.
CPC .......... *H04L 63/1416* (2013.01); *G06F 21/56* (2013.01); *G06F 21/577* (2013.01);
(Continued)

(58) Field of Classification Search
CPC .. G06F 21/56; G06F 21/577; G06F 2221/033; H04L 63/1466; H04L 63/33
See application file for complete search history.

(56) References Cited

U.S. PATENT DOCUMENTS 7,072,800 B1    7/2006  Fernandez et al.
7,623,463 B2 *  11/2009 Chavda .................. H04L 43/00
                                              370/235
(Continued)

FOREIGN PATENT DOCUMENTS

WO         2008103286       8/2008

OTHER PUBLICATIONS

Google "Multiple CRLF Injection / HTTP Response Splitting Vulnerabilities in Google AdWords", Google, Debasis Mohanty, 2 P., Dec. 14, 2006.
(Continued)

*Primary Examiner* — Saleh Najjar
*Assistant Examiner* — Devin E Almeida
(74) *Attorney, Agent, or Firm* — Sterne, Kessler, Goldstein & Fox, P.L.L.C.

(57) ABSTRACT

A method of detecting correlated operations in a common storage. The method comprises providing at least one input operation, each the input operation being designated to write uniquely identifiable data on a memory unit of an application, monitoring a plurality of output operations of the application, each the output operation includes data read from the memory unit, comparing between the at least one input operation and the plurality of output operations to identify at least one matching group of input and output operations wherein each member of the at least one matching group has correlated written or read data in a common correlated target address in the memory unit, and outputting an indication of the at least one matching group.

19 Claims, 6 Drawing Sheets

Related U.S. Application Data

(60) Provisional application No. 61/286,401, filed on Dec. 15, 2009, provisional application No. 61/307,879, filed on Feb. 25, 2010.

(51) Int. Cl.
*G06F 21/57* (2013.01)
*G06F 21/62* (2013.01)

(52) U.S. Cl.
CPC ...... *G06F 21/6245* (2013.01); *H04L 63/1433* (2013.01); *H04L 63/1466* (2013.01)

(56) References Cited

U.S. PATENT DOCUMENTS

| | | | |
|---|---|---|---|
| 7,945,434 B2 * | 5/2011 | Lovas | G06Q 10/04 702/186 |
| 8,726,394 B2 | 5/2014 | Maor et al. | |
| 9,043,924 B2 | 5/2015 | Maor et al. | |
| 9,280,668 B2 | 3/2016 | Maor et al. | |
| 2003/0093719 A1 | 5/2003 | Ali-Santosa et al. | |
| 2004/0015762 A1 | 1/2004 | Klotz et al. | |
| 2005/0055325 A1 | 3/2005 | Dutt et al. | |
| 2007/0192863 A1 * | 8/2007 | Kapoor | G06F 9/505 726/23 |
| 2007/0214503 A1 * | 9/2007 | Shulman | G06F 11/2257 726/22 |
| 2008/0120305 A1 | 5/2008 | Sima et al. | |
| 2008/0184208 A1 | 7/2008 | Sreedhar et al. | |
| 2008/0209567 A1 * | 8/2008 | Lockhart | G06F 11/3612 726/25 |
| 2008/0295178 A1 * | 11/2008 | Beresniewicz | G06F 21/554 726/25 |
| 2009/0089869 A1 | 4/2009 | Varghese | |
| 2009/0100518 A1 | 4/2009 | Overcash | |
| 2012/0255023 A1 | 10/2012 | Maor et al. | |
| 2012/0260344 A1 | 10/2012 | Maor et al. | |
| 2014/0331327 A1 | 11/2014 | Maor et al. | |

OTHER PUBLICATIONS

Huang et al. "A Testing Framework for Web Application Security Assessment", Computer Networks, 48: 739-761, 2005.
International Preliminary Report on Patentability dated Jun. 28, 2012 From the International Bureau of WIPO Re. Application No. PCT/IL2010/01059.
International Preliminary Report on Patentability dated Jun. 28, 2012 From the International Bureau of WIPO Re. Application No. PCT/IL2010/01060.
International Search Report and the Written Opinion dated Apr. 13, 2011 From the International Searching Authority Re. Application No. PCT/IL2010/01059.
International Search Report and the Written Opinion dated Mar. 30, 2011 From the International Searching Authority Re. Application No. PCT/IL2010/01060.
Office Action dated Aug. 4, 2015 From the Israel Patent Office Re. Application No. 220419.
Office Action dated Aug. 4, 2015 From the Israel Patent Office Re. Application No. 220420.
D. Scott; R. Sharp, "Abstracting application-level Web security", The 11th International Conference on the World Wide Web, (20020500), doi:doi:10.1145/511446.511498, pp. 396-407, XP058122193.
D. Scott; R. Sharp, "Developing secure Web applications", IEEE Internet Computing, (20020000), vol. 6, No. 6, doi doi:10.1109/M1C.2002.1067735, pp. 38-45, XP011095167.
EP 10837163.4, Extended European Search Report, dated Jun. 9, 2017, 9 pages.
EP 10837164.2 EPO Extended European Search Report, dated May 4, 2017, 9 pages.
Johns, Martin, et al., "XSSDS: Server-side Detection of Cross-site Scripting Attacks", Computer Security Applications Conference, 2008. ACSAC 2008. Annual, IEEE, Piscatawy, NJ, USA, Dec. 8, 2008, pp. 335-344.

* cited by examiner

METHODS AND SYSTEMS OF DETECTING AND ANALYZING CORRELATED OPERATIONS IN A COMMON STORAGE

RELATED APPLICATIONS

The present application is a continuation of U.S. patent application Ser. No. 13/515,545, filed on Jun. 13, 2012 (now U.S. Pat. No. 9,280,668), which is a national stage application of PCT/IL/1001060 filed on Dec. 14, 2010, which claims priority to U.S. Patent Application No. 61/307,879, filed on Feb. 25, 2010, which claims priority to U.S. Patent Application No. 61/286,401, filed on Dec. 15, 2009. The teachings of the above referenced applications are incorporated by reference as if fully set forth herein.

FIELD AND BACKGROUND OF THE INVENTION

The present invention, in some embodiments thereof, relates to a method and a system for assessment of applications and services and, more particularly, but not exclusively, to a method and a system for correlation assessment of applications and services according to actual data flow analysis.

Computer security issues are becoming more widespread as an ever-increasing number of diverse computer applications are developed. Problems such as viruses, worms, rootkits, spyware, and theft are plaguing the population of computer users and web services. Additionally, as the Internet connects more people to each other, it also is fueling security problems because confidential information is more easily compromised.

In their attempt to address Web application security, Scott and Sharp selected three types of security vulnerabilities they believed to be particularly important: form modification, SQL injection, and cross-site scripting (XSS), see D. Scott, R. Sharp, Abstracting application-level Web security, in: The 11th International Conference on the World Wide Web, Honolulu, Hi., May 2002, pp. 396-407 and D. Scott, R. Sharp, Developing secure Web applications, IEEE Internet Computing 6 (6) (2002) 38-45, which are incorporated herein by reference. They also suggested that form modification is often used in conjunction with other forms of attacks, for example, structured query language (SQL) injection. SQL injection and XSS account for the majority of Web application security vulnerabilities, see M. Curphey, D. Endler, W. Hau, S. Taylor, T. Smith, A. Russell, G. McKenna, R. Parke, K. McLaughlin, N. Tranter, A. Klien, D. Groves, I. By-Gad, S. Huseby, M. Eizner, R. McNamara, A guide to building secure Web applications. The Open Web Application Security Project v.1.1.1, September 2002, which is incorporated herein by reference.

The persistent (or stored) XSS vulnerability is a more devastating variant of a cross-site scripting flaw: it occurs when the data provided by the attacker is saved by a memory unit, such as a server, and then retrieved, for example permanently displayed on webpages returned to other users, in the course of regular browsing, without proper HTML escaping. A classic example of this is with online message boards where users are allowed to post HTML formatted messages for other users to read. In some Persistent XSS, an attacker's malicious script is rendered automatically, without the need to individually target victims or lure them to a third-party website. Particularly in the case of social networking sites, the code would be further designed to self-propagate across accounts, creating a type of a client-side worm. The methods of injection can vary a great deal: in some cases, the attacker may not even need to directly interact with the web functionality itself to exploit such a hole. Any data received by the web application (via email, system logs, etc) that can be controlled by an attacker could become an injection vector.

SUMMARY OF THE INVENTION

According to some embodiments of the present invention there is provided a method of detecting correlated operations in a common storage. The method comprises providing at least one input operation, each the input operation being designated to write uniquely identifiable data on a memory unit of an application, monitoring a plurality of output operations of the application, each the output operation includes data read from the memory unit, comparing between the at least one input operation and the plurality of output operations to identify at least one matching group of input and output operations wherein each member of the at least one matching group has correlated written or read data in a common correlated target address in the memory unit, and outputting an indication of the at least one matching group.

Optionally, the application is a network application.

Optionally, the at least one matching group is indicative of a plurality of application components sharing a common storage location.

More optionally, the outputting further comprises performing a cross site scripting (XSS) test on the plurality of application components and outputting a persistent XSS indication accordingly.

More optionally, the outputting further comprises performing a parameter tampering test on the plurality of application components and outputting a parameter tampering indication accordingly.

More optionally, the outputting further comprises performing a Cross-site request forgery test on the plurality of application components and outputting a Cross-site request forgery indication accordingly.

More optionally, the plurality of application components are activated asynchronously.

Optionally, the method further comprises recording the plurality of output operations and the at least one input operation in a first and second lists wherein the comparing being performed by matching the first and second lists.

Optionally, the providing comprises generating the at least one input operation.

More optionally, the method further comprises identifying at least one request parameter of an input operation to the network application and performing the generating according to the at least one request parameter.

Optionally, the at least one input operation is performed by a first component of the network application and the plurality of output operations are performed by a second component of the network application.

Optionally, the comparing comprises comparing between the at least one input operation and the plurality of output operations to identify at least one matching group having a non correlated written or read data in the correlated target address and testing the at least one matching group to determine whether the non correlated written or read data being correlated when a respective input operation being adjusted.

Optionally, the method further comprises using the at least one matching group for testing at least one security vulnerability in the network application.

More optionally, the testing is performed by: establishing a direct connection with the memory unit to access the correlated target address, generating an extraction query for receiving data from the correlated target address, submitting the extraction query, and verifying if a response to the extraction query modifies the read data.

Optionally, the method further comprises generating at least one of the at least one input operation as requests to extract user-specific data from at least one authenticated page, the comparing comprises identify at least one matching group having as a member at least one of the plurality of output operations with the user-specific data, the outputting comprises outputting an indication of unauthenticated or unauthorized access vulnerability according to the at least one matching group.

Optionally, the providing comprises: identifying user data of a first user, generating at least one of the at least one input operation as a request to access data of a second user using the user data, and submitting the request without passing at least one authentication process of the network application.

Optionally, the method further comprises: establishing a direct connection with the memory unit to access the common correlated target address, and checking whether at least some of the uniquely identifiable data being encrypted in the common correlated target address.

More optionally, the method further comprises generating the at least one input operation as a request comprising sensitive data: the checking comprises checking whether the sensitive data being encrypted in the common correlated target address.

Optionally, the monitoring comprises monitoring a sequence during which the input and output operations are performed, the comparing comprising monitoring, for each the operation, at least one of a change in the memory unit and a sequential read from the memory unit, the outputting comprises outputting a flow bypassing.

According to some embodiments of the present invention there is provided a runtime testing system of detecting correlated operations in a common storage. The runtime testing system comprises a submitting module which identifies at least one input operation designated to write uniquely identifiable data on a memory unit of a network application, a retrieving module which monitors a plurality of output operations having data read from the memory unit, a testing engine which compares between the at least one input operation and the plurality of output operations to identify at least one matching group of input and output operations wherein each member has written or read data in a common correlated target address in the memory unit, and an output unit which outputs the at least one matching group.

Optionally, the at least one matching group comprises a series of input operations each submitted from a different of a plurality of application components.

More optionally, each the application component is a different webpage accessed in a routing session.

More optionally, each the application component is a different webpage accessed in a cookie modification.

More optionally, at least some of the at least one input operation comprises at least one browsing operation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
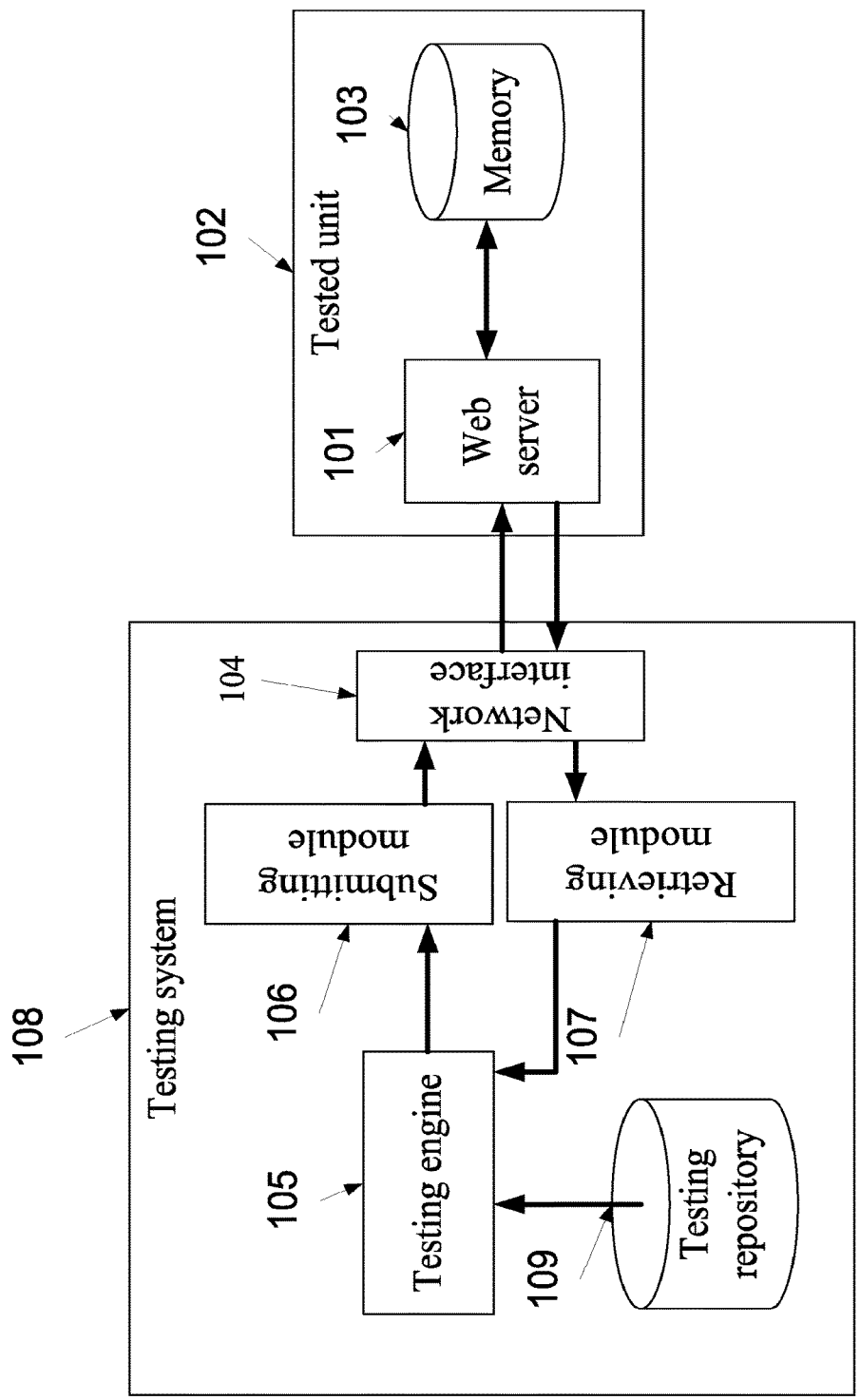
FIG. 1 is a schematic illustration of architecture of a runtime testing system connected to an exemplary tested unit for detecting storage correlation, according to some embodiments of the present invention.

The present invention, in some embodiments thereof, relates to a method and a system for assessment of applications and services and, more particularly, but not exclusively, to a method and a system for runtime correlation assessment of applications and services.

According to an aspect of some embodiments of the present invention there is provided a method and a system of detecting storage based correlation of two or more applications. Such correlations may be used to test security vulnerabilities, such as flow bypassing, persistent (or stored) XSS and/or unauthorized access to user data by identifying correlation among memory access operations to a common storage area and/or a plurality of various security vulnerabilities which are somehow spread over multiple code segments, such as SQL Injection, LDAP Injection, XPath Injection, Directory Traversal, Remote Execution and the like. The method is based on one or more input operations designated to write uniquely identifiable data in a memory unit of an application, such as a network application executed on a tested unit, such as a server. The input operations may be requests which are created according to an identification process during which operations of an application component of the network application is detected. Then output operations of the network application are monitored. Each output operation, which may be performed to any storage memory, such as a session memory, as part of a flow operation, and a queue, includes data read from the memory unit. The output operations may be initiated by the network application and/or performed in response to a request of an external application, such as a client terminal connected to the tested unit. Now, a comparison between the one or more input operations and the output operations is performed to identify a matching group in which input and output operations respectively have correlated written and read data. The input operations induce the writing of the uniquely identifiable data to a target address and the output operations include data extracted from the memory unit. The match group may be a pair of input and output operations, a series of input operations which induces the output operations, a request for user data and a response to this request, and the like. This process allows outputting an indication about the matching group, for example an indication about correlation between storage operations which may be used to test a security vulnerability, such as flow bypassing and persistent (or stored) XSS vulnerability and/or a plurality of various security vulnerabilities which are somehow spread over multiple code segments, such as SQL Injection, LDAP Injection, XPath Injection, Directory Traversal, Remote Execution and the like.

Optionally, the method and system are designed to detect a flow based cross site scripting.

Optionally, the input and output operations are performed by different application components which do not share any code, function, and/or any other element apart of using the memory unit as a data interface. Optionally, the different application components are activated asynchronously and/or randomly.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a schematic illustration of architecture of a runtime testing system 108 that is connected to an exemplary tested unit 102, according to some embodiments of the present invention.

The tested unit 102 executes one or more applications, such as web applications, web services, and/or databases, for brevity referred to herein as tested network applications or network applications, which are optionally designed to allow uploading and downloading of content, for example textual, visual, and/or audible content, via a communication network, such as the Internet. Each network application has a number of components which perform input and output operations on a memory, such as memory unit 103. As used herein, an input operation means any form of submitting content and a output operation means any form of retrieving content, both either in a push or pull manner. For example the tested applications may a blogging service, a website having a talkback application, a file sharing service, a website having user profile creation application, and/or any other application in which third parties upload and/or download data, in a push or pull modes.

It should be noted that the runtime testing system 108 may be used for testing applications which have been developed in various environments, including but not limited to .Net, Java, Hypertext Preprocessor (PHP), Transact SQL (T-SQL), and Procedural Language (PL)/SQL. Optionally, the tested unit 102 includes a web server 101, such as Apache. Microsoftm IIS™ or WebSTAR™, and a runtime environment 103, such as Java Run-Time Environment (JRE) and Common Language Runtime (CLR), which the standards thereof are incorporated herein by reference. The runtime testing system 108 is a component that analyzes the execution of application in runtime, including analysis of the code executed, memory changes, inputs and outputs. For example, the runtime testing system 108 is defined as described in U.S. Patent Application No. 61/286,401, filed on Dec. 15, 2009 which is incorporated herein by reference. The runtime testing system 108 may perform the analysis using aspect oriented programming (AOP), debugging monitoring and/or hooks which are inputted into the runtime environment.

The runtime testing system 108 includes a network interface 106 that that is optionally designed to communicate with the network application executed by the tested unit 102, for example with a web server 101, optionally via a network port. The runtime testing system 108 includes a testing engine 105 that executes one or more test logics according to test records hosted in a testing repository 109. The runtime testing system 108 further includes a submitting module 106 that is set to submit and/or monitor one or more test data inputs, in one or more input operations, via the network interface 106, to the network applications executed by the tested unit 102. The runtime testing system 108 further includes a retrieving module 107 that receives or monitors one or more data outputs from the network applications executed by the tested unit 102 in one or more output operations. The connections established by the network interface 106 allows the submitting module 106 to transmit test data inputs having uniquely identifiable data as messages to the network applications executed by the tested unit 102 and to the retrieving module 107 to receive responses therefrom, for example hypertext transfer protocol (HTTP) request and response messages. For brevity, these messages may be referred to herein as messages. It should be noted that the submitting and retrieving modules 106, 107 may be implemented as a single module.

As outlined above, the runtime testing system 108 includes the testing engine 105, for example similar to the described in U.S. Patent Application No. 61/286,401, filed on Dec. 15, 2009 which is incorporated herein by reference. This component is optionally connected to a repository 109 for storing a testing logic, optionally in a dataset that includes a plurality of connected records, each consist a set of instructions for a different test session. As used herein, such a set of instructions may be referred to as a test session record and/or test session node. The testing engine 105 is designed to execute a number of test sessions, optionally iteratively, for example as described below. In each test session, one or more test data inputs are submitted in one or more input operations to the network application executed by the tested unit 102 and one or more outputs which are received therefrom. This allows comparing between an input log that documents the test data inputs and an output log that documents the outputs.

The analysis of the outputs of the tested unit 102, in light of the test data inputs, allows, as further described below, identifying data related to operations in the code executed by the tested unit 102. For example, an access to the memory unit 102, which is a data repository such as database, an lightweight directory access protocol (LDAP) Server, a file system, a session, a hardcoded data, a memory, and queue may be identified. Additionally or alternatively, operations such as a creation of data, a modification of data, a deletion of data, and/or reading data, from the memory unit 102 may be identified. Additionally or alternatively, the testing engine 105 correlates user-provided input with the aforementioned operations. Additionally or alternatively, the testing engine 105 correlates data originated from the memory unit 102 and forwarded to another memory unit and/or to any network node.

Figure 2:
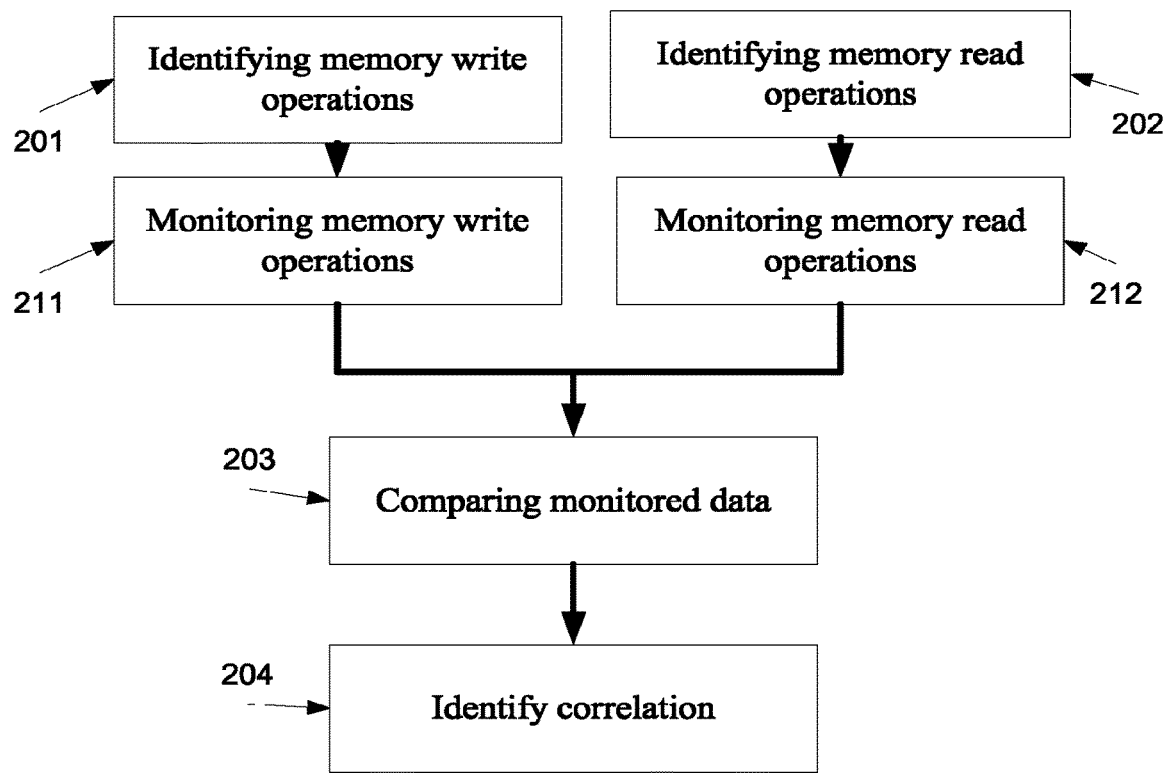
FIG. 2 is a flowchart of an exemplary testing session in which one or more testing data inputs are correlated with outputs of the tested application, according to some embodiments of the present invention.

Reference is now also made to FIG. 2, which is a flowchart of an exemplary testing session in which one or more testing data inputs are correlated with outputs of the tested application, according to some embodiments of the present invention. The testing session 200 is performed to identify two separate application components of the tested unit 102 which are sharing a common data element, such as a common virtual and/or physical storage in the memory unit 103. These application components may not have any other connection or communication, for example no code calls which associated therebetween. This test session creates a connection between them as it tests a code flow which indicates the presence or absence of such a shared data element.

Optionally, such a test session allows identifying two separate application components, one inputs data to the memory unit 103 and the other extracts the same data from the memory unit 103.

Optionally, such a test session allows identifying application components which are part of an operation flow wherein a number of different application components, such as web pages with different uniform resource identifiers (URLs), are set to be executed in a certain order.

Optionally, such a test session allows identifying asynchronous operations where application components are asynchronously activated by extracting data from an operations manager. These application components may reside in common or separate tiers. For example, such application components are asynchronously activated in operations of applications, such as a job scheduler or queued operations.

The test session is optionally, a correlation in which data operations, such as read, write, delete, and modify are mapped and data that is inserted by one or more components is correlated with data that is extracted by one or more of other application components. Optionally, the correlation is granular to identify the data storage location and origin.

As shown at 201, input operations, such as data insertions and/or modifications, of one or more application components of the tested unit 102 are identified, and monitored, as shown at 211. The storage location of each such input operation in the memory unit 103 is mapped, for example the column and the row coordinates in a table hosted by an identified database. Optionally, the insertions and/or modifications are stored in a first list.

As shown at 202, the output operations are identified, for example data extractions of the application components, and monitored, as shown at 212. The origin storage location of each such extracted data in the memory unit 103 is mapped, for example the column and row in the table hosted by an identified database. The reception may be performed in response to a data request and/or automatically outputted by the tested unit 102. Optionally, the data extractions of all the application components are stored in a second list.

Optionally, the submitting module 106 generates test input data for emulating possible input operations. Optionally, the retrieving module 107 receives the extracted data. The test input data is optionally inputted in a message having a form of an input operation as identified in 201.

Now, as shown at 203, the testing engine 105 compares between the insertions or modifications and the extracted data, for example by comparing the first and second lists. The comparison is optionally performed according to the storage location in the memory unit 103. The comparison allows identifying a match between one of the insertion records and one of the extracted data records. The match indicates that a record in a row, created or modified in the first list, in response to an input operation, such as an insertion and a modification, includes the same data as an extracted data record.

If a storage location match is found between input and output operations however the data itself is different, the testing engine 105 attempts to check whether a testing data input, such as a user input, has influence over the storage location.

For example, when the memory unit 103 is a queue, the testing engine 105 identifies all instances of inserting events or requests into suspected storage location in the queue. In this example, as shown at 201 and 211, the precise information of each request is listed in an input list, including the data transferred in the request, and request information, such as time stamp, identification (ID), and the like.

Than, as shown at 202 and 212 all instances of retrieving events and/or requests from the queue are identified and monitored. For each such request, the precise information is listed in an output list, including the data of the request, request information, etc.

Now, as shown at 203, the testing engine 105 compares the input and output lists and identifies potential pairing between queue insertion events and queue extraction events. It then creates a new request, containing uniquely identifiable data, and verifies whether the specific suspected storage locations follow on the same flow.

Optionally, the testing engine 105 includes a dataflow tracker which identifies when a certain application component performs an actual data alteration, for example a modification, a creation, and/or a deletion, in persistent data storage. This identification may be used to determine whether a certain application component is used for viewing only and/or actually modifies, adds and/or deletes data. Optionally, the dataflow tracker monitors information about data alterations, for example the identification of the components initiated the data alterations. Than, the dataflow tracker monitors which components participate in a flow starting with input data, referred to as a flow start point, and ending in static memory unit. The dataflow tracker identifies correlations between two or more flows by matching a flow end point of one flow with a start point of another flow. Once a correlation has been detected, the dataflow tracker initiates a test session to verify this correlation with a uniquely identifiable data, for example as described above. In one example, a wire transfer from one account to another initiates from a user account which is accessed via a web page hosted by a bank website. The transaction details are checked against records of the bank. If the money is available in the account, the wire transfer is added as a transaction to a daily queue which is backed up in a database record for later processing. Later on, a second flow starts where another component reads the transaction record and forwards it into a processing queue from which the transaction details are read and accordingly new account balances are calculated. As a result of this calculation, the respective account records are updated. When a user checks one of the accounts after the transaction is completed, the webpage reads new data from the account records and displays the new calculated balance. The dataflow tracker, in this example, identifies two flows. First flow includes the first user's request, through the queue, until the new calculated balance is written in the account records and a second flow which starts when the user requests to see account balance and until the actual data extraction from the database. The dataflow tracker finds a correlation between these two flows and verifies it implementing a test session, as described above.

As shown at 204, one or more correlations between storage operations may be detected according to the comparison. Optionally, the correlation is used to test one or more security vulnerabilities, as described below. Optionally, test session 200 is used for detecting persistent cross site scripting wherein the input operations are inputs originating from one webpage and loaded into another webpage. Optionally, the testing engine 105 includes a separate application components correlation module that identifies instances where an input operation, such as a user input provided in a certain webpage, is stored in the memory unit 103 and then forwarded to another page. Following this identification, the test is performed similarly to a normal XSS testing, with the input being generated in one request, and the output being read from a $2^{nd}$ request For example, similarly to 201, insertion/modification operations, such as INSERT or UPDATE operations are identified.

These operations are recorded in a list of potential database inputs, including its storage location, for example table name and column coordinates, and information pertaining to an application invoking the operation, for example URL parameters and/or any other identification data. Optionally, every database data extraction operation, such as SELECT, which results in retrieving data, for example presenting data to the user who submitted the user input, is identified.

Each one of the operations recorded in a list of the potential database outputs, including table name and column coordinates, and the applications invoking the operation, for example its URL parameters.

The testing engine 105 identifies all matches where a certain record in a certain column is updated by one component and then extracted by another component, and marks them as potential correlated pages. Optionally, the identification is performed as depicted in FIG. 2.

According to some embodiments of the present invention, the testing engine 105 detects correlated operations in a common storage which are indicative of a flow bypassing attack security vulnerability. Flow bypassing attack security vulnerability exist when an application hallows a user to execute a certain sequence of operations, for example by presenting wizard, allows an attacker to circumvent certain security checks by skipping or avoiding one or more of the operations in the sequence while completing the certain sequence. Optionally, the data flow tracker identifies such circumventable scenarios. In use, the data flow tracker records write and read operations to a shared memory of a flow, for instance, a session memory, the data flow tracker then analyses the recorded data to determine whether a certain operation in the flow reads user-specific data from the memory without updating the memory with any resulting information or with updating the memory but following operations ignore that update. The system may now perform a verification to determine whether the certain operation performs a security check by replicating the flow using invalid values and check whether this operation stops the flow execution. This allows verifying a flow bypassing security vulnerability by repeating the flow using invalid values without calling the security check and verifying that the operation has not been blocked.

Figure 3:
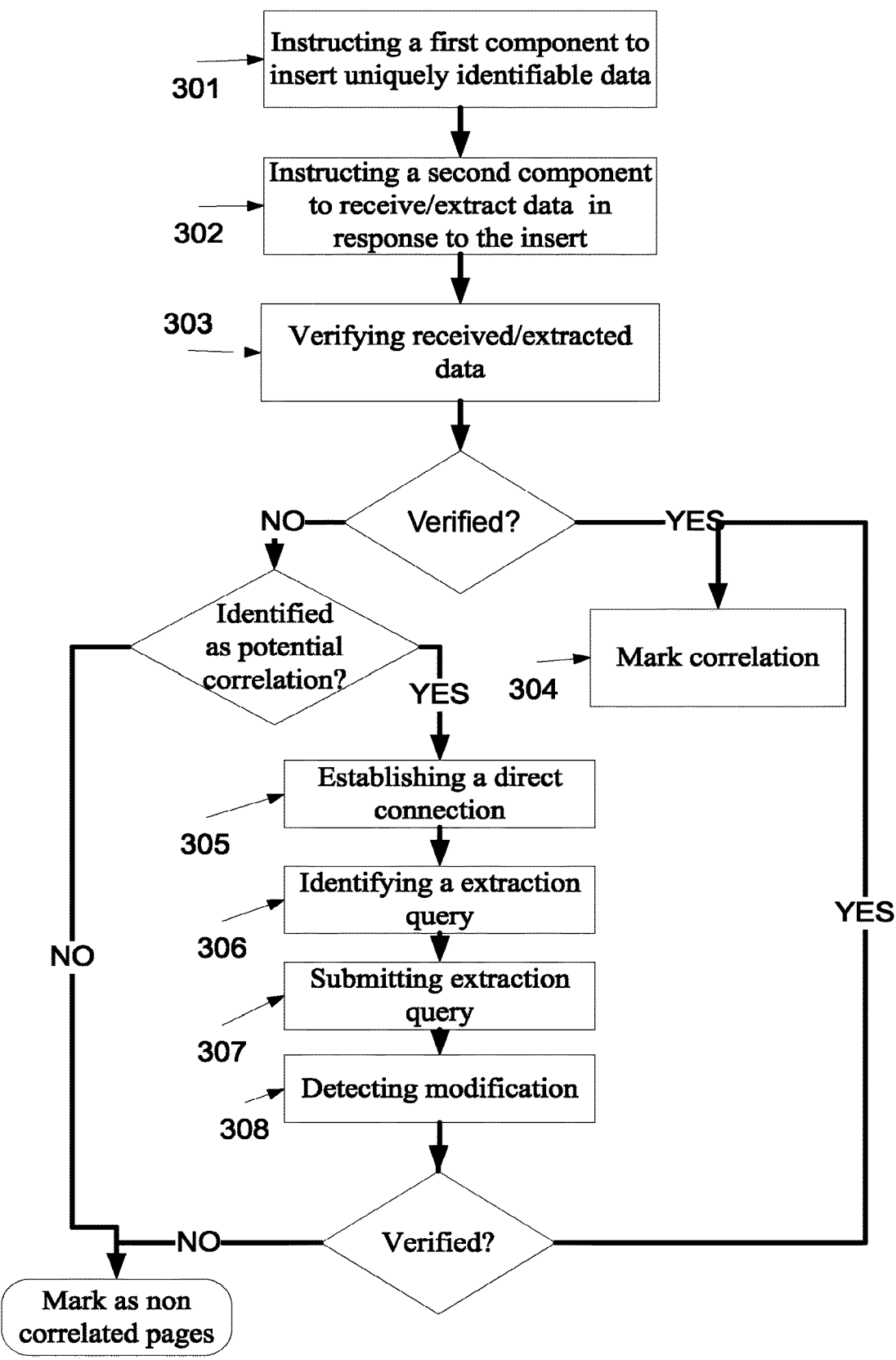
FIG. 3 is a flowchart of an exemplary verification process for each such identified pair, according to some embodiments of the present invention.

Reference is now made to FIG. 3 which depicts a verification process for each such an identified pair, according to some embodiments of the present invention. First, as shown at 301, one of the application components is invoked for inserting uniquely identifiable testing data and/or modifying data to include uniquely identifiable testing data.

Than, as shown at 302, a second application component is invoked to extract the inserted data and/or set to automatically receive the inserted data during the execution of the tested application 100.

Now, as shown at 303, the presence or absence of the uniquely identifiable data in the extracted and/or received data is verified. If verified, a page correlation is marked and optionally outputted, as shown at 304. Else, if the uniquely identifiable data is not in the outputs, namely the written and read data are not correlated; the following is performed to verify the presence or absence of page correlation:

First, as shown at 305, a direct connection, such as a database connection, is used to identify whether the record in the memory unit 103 from which the data of the output is taken contains the uniquely identifiable data and optionally all the column names and/or values for that record. It should be noted that the connection may be to extract data from a file system and/or a session memory.

As shown at 306, an extraction query used by the second application component to extract the data is identified, for example using request parameters as a query filter. In such a manner, references, such as links, which do not appear in a certain webpage however may be logically related to it can be identified. For example, when a user posts a comment to an article published in a webpage of a website, the posted comment is sent to and stored in a specific record with a sequential identification (ID), for instance 11. The posting is performed in a designated webpage to which the user is directed. If the default page view of the article webpage is set to show only the first 10 comments (myweb/articles?ID=1&Comments=10), the user is redirected back to the article webpage, where the comment does not appear. In such a case, the input data does not appear as output data. The testing engine finds correlation between the insert instruction and the extract instructions, and manipulates the web page parameter to fetch the specified user input (myweb/articles?ID=1&Comments=11). Now, as shown at 307, the identified extraction query is now submitted to request the unverified data. This allows, as shown at 308, determining or verifying whether the extraction query modifies the extracted data and determining if extracted data matches the values of the uniquely identifiable data without that modification. For example, the testing engine 105 verifies that the response of the application component of the network application executed by the tested unit 102 matches to the response to the created extraction query. If verification is performed, a correlation is identified. Now, if a correlation between two application components is identified, an indication of a potential PXSS is marked, as shown at 304. Following that, normal tests for XSS are performed. For clarity, it should be noted that the manner reflected XSS test is held may be different from the manner persistent XSS test is held. During the test a request, which is defined according to the identified correlation, is sent to emulate an attack. Then a another request is sent to examine the response and to check whether the XSS is followed through.

Figure 4:
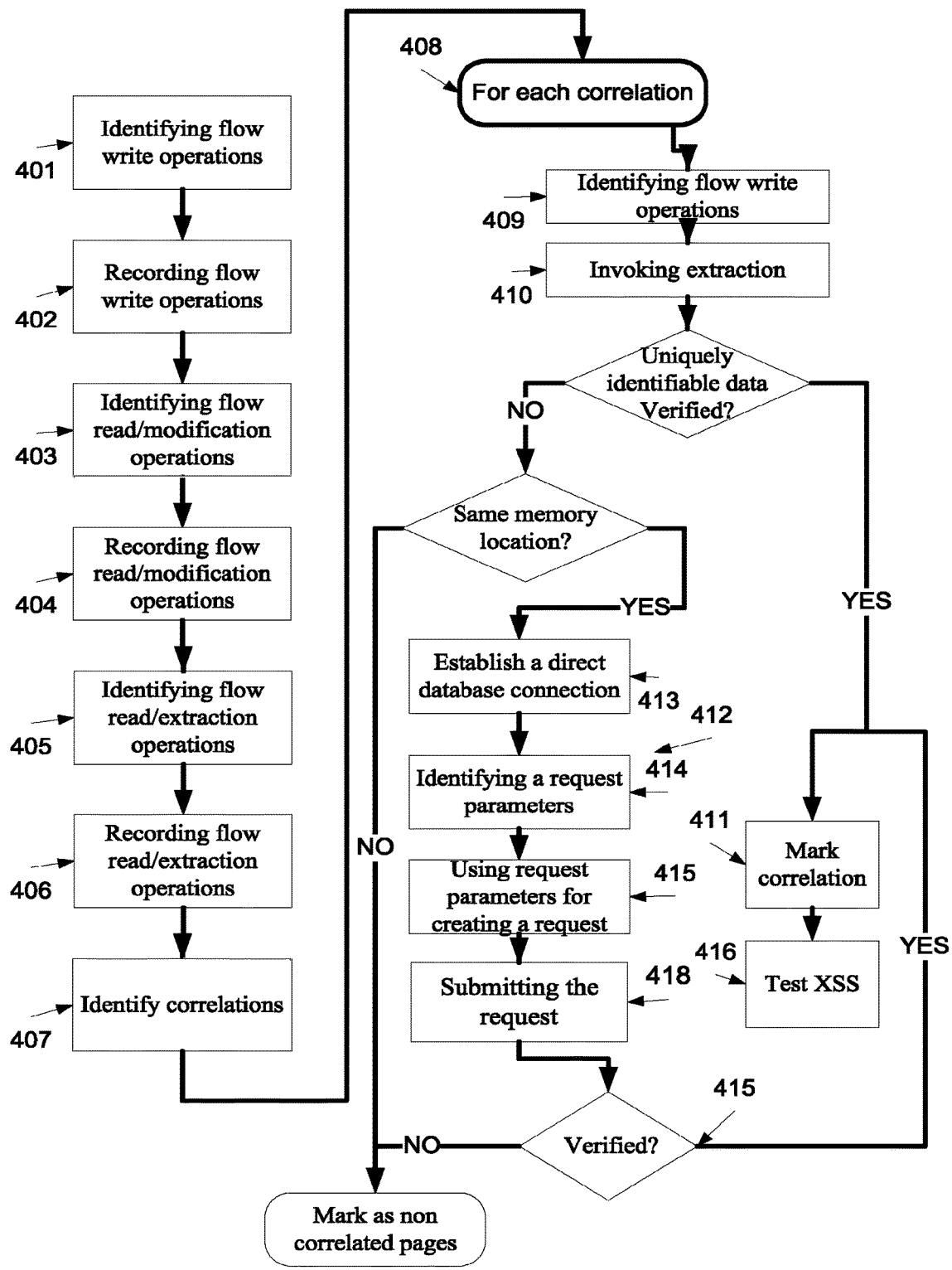
FIG. 4 is a method of identifying persistent XSS (PXSS) in a flow of a plurality of input and output operations, according to some embodiments of the present invention.

Reference is now made to FIG. 4, which is a method of identifying PXSS in a flow of a plurality of input and output operations, according to some embodiments of the present invention. It should be noted that any number of application components may be involved in the process, in any number of tiers. First, as shown at 401, flow operations, such as sequential browsing operations and/or cookie modifications, such as Add, Set or Remove, are identified.

Then, as shown at 402, each operation is recorded in a list of potential flow operations, such as routing sessions and cookie inputs, including keys, value and with information about the related application component invoking this operation, for example URL and/or other ID parameters.

As shown at 403, the testing engine 105 identifies every routing session or cookie data read and/or extraction operations, such as GET, and/or every database data modification operation, such as INSERT and UPDATE.

As shown at 404, each operation is recorded in the list of potential Database inputs, including table name and column coordinates, and the information about the application invoking this operation, for example as described above.

As shown at 405, the testing engine 105 identifies every database data read/extraction operation, such as SELECT, which results in retrieving, for example presenting, the data to the user.

As shown at 406, each read/extraction operation is recorded in a list of the potential database outputs, including table name and column coordinates, and information about the application component invoking this operation, for example URL, as described above.

Now, as shown at 407, the testing engine 105 identifies all correlations in which a match between an operation, such as insertion/update operation, which is performed in a certain location in the memory unit 103, for example in a specified column and an extraction/output operation in which the data in the certain location is extracted or read by another component. The correlation may be used to mark potential correlated pages.

Now, as shown at 408, the testing engine 105 performs the following verifications for each correlation:

First, as shown at 409, testing data, such as uniquely identifiable data, is used to invoke application components which perform the insertion and/or modification of data including. Optionally, all the application components, which are involved in the session or the cookie modification, are invoked. As shown at 410, the extraction of data is optionally invoked, for example by invoking the application component that extracts the data. Now, the presence of the uniquely identifiable data in the extracted data is verified. If it is present, the page correlation is verified. Else, as shown at 412, a filtering check is performed to verify that the uniquely identifiable data is not in an output generated as a result of filtering the extracted data using certain criteria, such as a WHERE statement.

In this scenario, the following is performed:

First, as shown at 413 a direct database connection is used to identify whether the uniquely identifiable information is stored in the actual record in the memory unit 103. Then, as shown at 414, the testing engine 105 identifies which request parameters have been used to create a query filter. Optionally, the identification is performed by analyzing the extraction query outputted by an extraction application component of the tested unit 102. Optionally, as shown at 415, such a request is created and submitted, as shown at 418, to the extraction application component with a certain value modified so that the criteria match the values of the relevant records. Accordingly, the testing engine 105 verifies that the output of the tested unit 102 contains the uniquely identifiable data.

As shown at 411, once a correlation between two application components has been identified, namely when a first application component inserts data to the memory unit 103 and a second application component retrieves it from the memory unit 103 to the user, a potential PXSS is marked. Now, as shown at 416, a XSS test is performed, for example as commonly known in the art.

Figure 5:
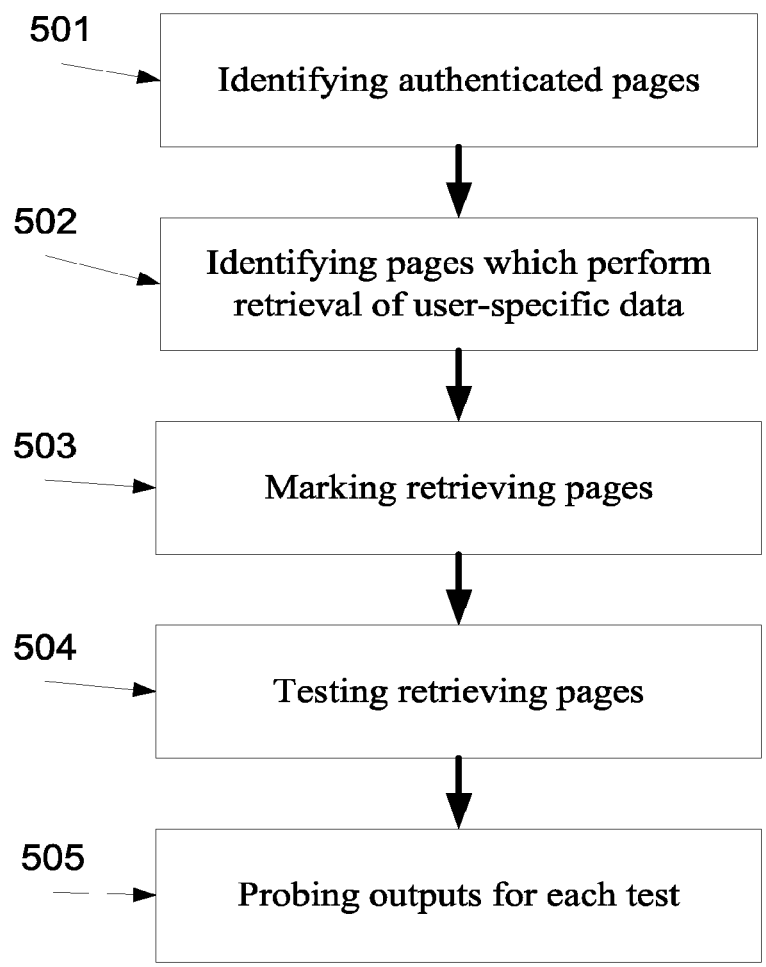
FIG. 5 is a flowchart of a method 500 of identifying unauthenticated and/or unauthorized access, according to some embodiments of the present invention.

Reference is now made to FIG. 5, which is a flowchart of a method 500 of identifying unauthenticated and/or unauthorized access, according to some embodiments of the present invention. This method 500 allows identifying ability of an attacker to access an internal page, which normally requires a certain authentication, without being authenticated or properly authorized. Additionally or alternatively, the method 500 allows identifying an attacker which accesses an internal page as a user having a first set of privileges while being authenticated as a user with a second set of privileges. This is performed by tracking data flow of the protected data, and comparing the data flow of a properly authorized user vs. an unauthorized user.

First, as shown at 501, optionally during probing, one or more authenticated pages are identified, optionally by a data collector module and/or analyzed by the 5 testing engine 105.

Than, as shown at 502, optionally during probing, the testing engine 105 examines the marked pages to identify retrieval user-specific data, for example a redirection to a page having a user-specific data in a uniform resource locator (URL). Optionally, the testing engine 105 verifies that this retrieval user-specific data is not system data by verifying the compliance with one or more rules, such as:

1. Whether data extracted is different for different user types.
2. Whether data may be extracted using filtering criteria relying on user specific information, such as username and/or user ID.

As shown at, 503, the testing engine 105 marks authenticated pages which extract user-specific data. Then, as shown at 504, for each marked page a test is invoked. The test simulates a request having parameter values of taken from the user-specific data without performing adequate authentication, for example without any authentication and/or while performing authentication for other data, other user, and/or for performing authentication of privileges which are insufficient for the requested data.

For each test, as shown at 505, the output of the tested unit 102 is tracked to determine whether the application component of the tested unit 102 respond to the request with the requested data. If so, unauthenticated access is identified.

Additionally or alternatively other vulnerabilities may be detected.

Optionally, the testing engine 105 is used for detecting parameter tampering and/or cookie poisoning vulnerability. In these embodiments, the ability of an attacker to gain access to data of a user by modifying certain information in the request is detected, for example similarly to FIG. 5. Additionally or alternatively, the ability of an attacker to gain access to data of a user by modifying a flow of user data in a data session similarly is detected. The detection is performed by logging into a service provided by the tested unit 102 with multiple users, and utilizing a data tracker to identify the unique data pertaining to each user. The testing engine 105 tries to access additional data of a respective user using the unique data. In such an embodiment, data extracted in a certain routing flow using a certain user profile, is used for extracting data of another user, having a different user profile, without fully passing the authentication processing, based on a similar flow.

According to some embodiments of the present invention, the testing engine 105 detects a cross site request forgery (CSRF) vulnerability by identifying requests which do not contain any random data in correlation with an actual operation performed by submitting a request. Such an operation means actual sustainable data alteration, such as an operation which leaves a permanent trace, for instance changes data in a permanent storage.

As described above, the testing engine 105 verifies parameter tampering security vulnerability. In order to avoid false positive detections, the testing engine 105 verifies whether data extraction rely on a unique random large token. If a parameter tampering attack is performed with a long and random parameter than such a parameter tampering attack may not be feasible. For example, when the parameter comprises 6 characters or more and is assigned, for each entry, based on a random algorithm, for example when there is no logical algorithm, such as a sequential assignment, that could be used to estimate a new value based on a collection of existing values.

Figure 6:
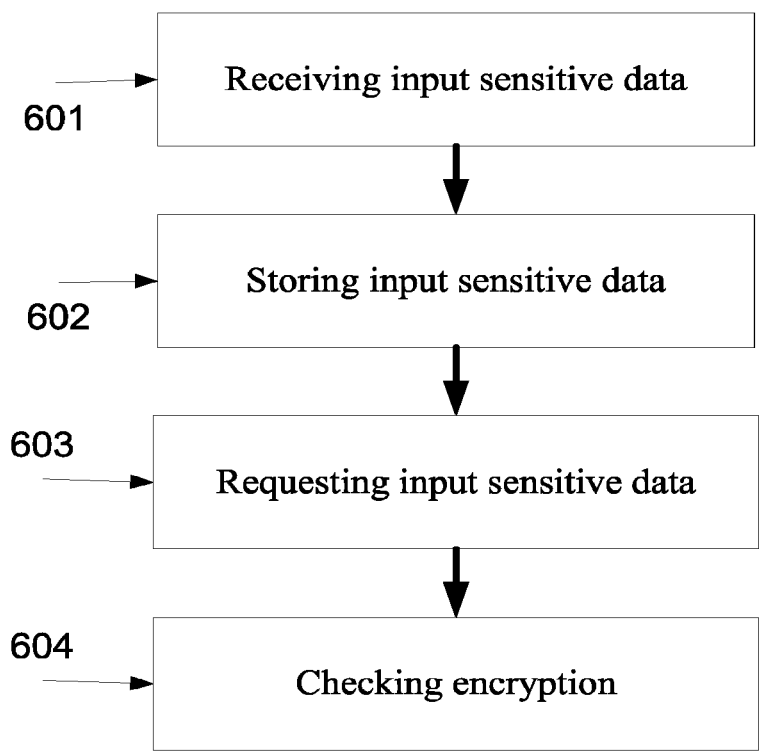
FIG. 6 is a schematic illustration of a method of identifying unencrypted sensitive data in the memory, according to some embodiments of the present invention.

Reference is now made to FIG. 6, which is a schematic illustration of a method 600 of identifying unencrypted sensitive data in the memory unit 103, according to some embodiments of the present invention. First, as shown at 601, the testing engine 105 generates and/or receives as input sensitive data for example a login, a password change, a registration and/or a password recovery, a credit card number, a billing ID, a social security number, an ID number and the like. As shown at 602, the unencrypted sensitive data is set in the form of an operation of the application components of the tested unit 102 to store the input sensitive data in the memory unit 103.

As shown at 603, requests, generated by these application components, and optionally database operations, executed for retrieving and/or setting the unencrypted sensitive data, are monitored.

Now, as shown at 604, the testing engine 105 checks whether the unencrypted sensitive data is encrypted. Optionally, the testing engine 105 checks whether data inputted into and/or outputted from the memory unit 103 being substantially identical, or identical, to the unencrypted sensitive data sent in the request. Optionally, the testing engine 105 checks whether the unencrypted sensitive data is encrypted in a set of known encryption methodologies.

Optionally, the testing engine 105 is connected directly to the memory unit 103, identifies the relevant record, and checks whether the unencrypted sensitive data appears in an identical form to its appearance in the request. Optionally, the testing engine 105 checks whether the password in the memory unit 103 is encrypted in one or more known encryption methodologies. Optionally, the testing engine 105 determines whether strong or weak encryption has been applied according to the encryption analysis.

It is expected that during the life of a patent maturing from this application many relevant systems and methods will be developed and the scope of the term network, security vulnerability and interface is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method, performed by a testing system communicatively connected to a tested unit, of detecting correlated operations in a common storage of the tested unit, comprising:
   identifying, by the testing system, at least one input operation of the tested unit, said input operation being designated to write uniquely identifiable test data on a memory of an application of the tested unit;
   monitoring, by the testing system, a plurality of extracted output operations of said application of the tested unit, each said extracted output operation including uniquely identifiable test data read from said memory;
   comparing, by the testing system, said at least one input operation of the tested unit and said plurality of extracted output operations of said application of the tested unit to identify at least one matching group of input and output operations wherein said at least one matching group has a verified presence or absence of correlated written or read uniquely identifiable test data in a common correlated target address in said memory, wherein the at least one matching group indicates a potential correlation,
   wherein said comparing comprises comparing between said at least one input operation and said plurality of extracted output operations to identify at least one matching group having non-correlated written or read data in said common correlated target address and testing said at least one matching group to determine whether said non-correlated written or read data is correlated when a respective input operation is adjusted, and
   wherein the testing is performed by:
      establishing a connection with said memory to access said common correlated target address,
      generating an extraction query for receiving data from said common correlated target address,
      submitting said extraction query to the tested unit, and verifying whether a response to said extraction query modifies said data in the response; and
   outputting an indication of said at least one matching group when the response to said extraction query modifies said data in the response.

2. The method of claim 1, wherein said application is a network application.

3. The method of claim 1, wherein said at least one matching group is indicative of a plurality of application components sharing a common storage location.

4. The method of claim 3, wherein said outputting further comprises performing a cross-site scripting (XSS) test on said plurality of application components and outputting a persistent XSS indication accordingly.

5. The method of claim 3, wherein said outputting further comprises performing a parameter tampering test on said plurality of application components and outputting a parameter tampering indication accordingly.

6. The method of claim 3, wherein said outputting further comprises performing a cross-site request forgery test on said plurality of application components and outputting a cross-site request forgery indication accordingly.

7. The method of claim 3, wherein said plurality of application components are activated asynchronously.

8. The method of claim 1, further comprising recording said plurality of extracted output operations and said at least one input operation in a first list and a second list, wherein said comparing is performed by matching said first and second lists.

9. The method of claim 1, further comprising generating said at least one input operation.

10. The method of claim 2, further comprising identifying at least one request parameter of an input operation to said network application and performing said generating according to said at least one request parameter.

11. The method of claim 2, wherein said at least one input operation is performed by a first component of said network application and said plurality of output operations are performed by a second component of said network application.

12. The method of claim 2, further comprising using said at least one matching group for testing at least one security vulnerability in said network application.

13. The method of claim 1, further comprising:
   generating at least one of said at least one input operation as requests to extract user-specific data from at least one authenticated page, said comparing comprises identifying at least one matching group having as a member at least one of said plurality of output operations with said user-specific data, said outputting comprises outputting an indication of unauthenticated or unauthorized access vulnerability according to said at least one matching group.

14. The method of claim 2, further comprising:
   identifying user data of a first user, generating at least one of said at least one input operation as a request to access data of a second user using said user data, and submitting said request without passing at least one authentication process of said network application.

15. The method of claim 1, further comprising:
   establishing a direct connection with said memory to access said common correlated target address; and
   checking whether at least some of said uniquely identifiable test data being encrypted in said common correlated target address.

16. The method of claim 15, further comprising:
   generating said at least one input operation as a request comprising sensitive data, wherein said checking comprises checking whether said sensitive data being encrypted in said common correlated target address comprises an element selected from a group consisting of a login, a password change, a registration, a password recovery, a credit card number, a billing identifier, a social security number, and an identifier number.

17. The method of claim 1, wherein said monitoring comprises monitoring a sequence during which said input and output operations are performed, said comparing comprising monitoring, for each said operation, at least one of a change in said memory and a sequential read from said memory, said outputting comprises outputting a flow bypassing.

18. A runtime-testing computer program product that detects correlated operations in a memory unit of a network application, the runtime-testing computer program product implemented in a non-transitory computer-readable storage medium as computer-executable instructions that, when executed by at least one processor of a computer system, cause the at least one processor to perform operations comprising:

identifying at least one input operation designated to write uniquely identifiable data on the memory unit of the network application;

monitoring a plurality of output operations having data read from said memory unit;

comparing between said at least one input operation and said plurality of output operations to identify at least one matching group of input and output operations, wherein each member of the matching group has written or read data in a common correlated target address in said memory unit, wherein said comparing comprises comparing between said at least one input operation and said plurality of output operations to identify at least one matching group having non-correlated written or read data in said common correlated target address and testing said at least one matching group to determine whether said non-correlated written or read data is correlated when a respective input operation is adjusted, and wherein the testing is performed by:

establishing a connection with said memory to access said common correlated target address, generating an extraction query for receiving data from said common correlated target address, submitting said extraction query to a tested unit, and verifying whether a response to said extraction query modifies said data in the response; and outputting an indication of said at least one matching group when the response to said extraction query modifies said data in the response.

19. The runtime-testing computer program product of claim 18, wherein said testing is performed by:

establishing a direct connection with said memory unit to access said common correlated target address;

generating an extraction query for receiving data from said common correlated target address;

submitting said extraction query;

and verifying whether a response to said extraction query modified said data in the response.

* * * * *